UNITED STATES PATENT OFFICE.

CHARLES PICKERT, OF OSWEGO, NEW YORK.

WHITE LIQUID DRIER FOR PAINTS.

SPECIFICATION forming part of Letters Patent No. 243,154, dated June 21, 1881.

Application filed February 14, 1881. (Specimens.)

*To all whom it may concern:*

Be it known that I, CHARLES PICKERT, a citizen of the United States, residing at Oswego, in the county of Oswego and State of New York, have invented certain new and useful Improvements in Liquid Drier for Paints; and I do hereby declare the following to be a full, clear, and exact description of the invention, such as will enable others skilled in the art to which it appertains to make and use the same.

The object of this invention is to produce an improved white liquid drier for paints.

The said invention consists partly in the peculiar process employed, and partly in the resulting composition of matter, substantially as hereinafter set forth and claimed.

To make my drier I use the following ingredients, preferably in the proportions stated: linseed-oil, four gallons; turpentine, sixteen gallons; borate of manganese, one-half pound; sugar of lead, one pound; white shellac, one-eighth pound; gum-frankincense, one-eighth pound.

The method or process of manufacture is as follows: The oil is first placed in a receptacle, and all the other ingredients above named, except the turpentine, are added thereto. Steam heat is then applied to the receptacle by causing a current of steam (preferably superheated to a high degree) to flow around the same or in any other way. The steam does not touch the mixture. During this application of steam heat the ingredients are stirred together until all are dissolved in or commingled with the oil, so as to form one homogeneous composition throughout. The mixture is then allowed to cool to not less than 212°. The turpentine is then added, the stirring meanwhile continuing. The composition is then allowed to slowly cool and settle, and when thoroughly cooled it is ready for use.

Instead of sugar of lead, I may substitute sulphate of zinc, and instead of turpentine, benzine.

Having thus described my invention, what I claim as new, and desire to secure by Letters Patent, is—

A liquid drier consisting of linseed-oil, turpentine, borate of manganese, sugar of lead, white shellac, and gum-frankincense.

In testimony whereof I affix my signature in presence of two witnesses.

CHARLES PICKERT.

Witnesses:
CHARLES W. BARNES,
F. E. HAMILTON.